United States Patent [19]
Musgrave et al.

[11] Patent Number: 5,778,824
[45] Date of Patent: Jul. 14, 1998

[54] MAGNETIC DEVICE AND METHOD FOR FEEDING AQUATIC ANIMALS

[76] Inventors: Gary Musgrave; Frances L. Farmer, both of 267-27th St., San Francisco, Calif. 94131

[21] Appl. No.: 594,570

[22] Filed: Jan. 31, 1996

[51] Int. Cl.$^6$ ..................................................... A01K 61/00
[52] U.S. Cl. .................... 119/230; 119/51.04; 119/247
[58] Field of Search .................. 119/230, 51.04, 119/212, 247, 253, 245

[56] References Cited

U.S. PATENT DOCUMENTS

| | | | |
|---|---|---|---|
| 1,976,962 | 10/1934 | Pape | 119/51.04 |
| 2,036,076 | 3/1936 | Philippi | 446/135 |
| 2,761,422 | 9/1956 | Martin | 119/51.04 |
| 2,977,082 | 3/1961 | Harris | 248/206.5 |
| 3,499,526 | 3/1970 | Willinger | 119/51 |
| 3,583,702 | 6/1971 | Glass | 273/1 |
| 3,664,303 | 5/1972 | Baensch | 119/51 |
| 4,820,556 | 4/1989 | Goldman et al. | 428/7 |
| 5,028,223 | 7/1991 | Ameter | 425/12 |
| 5,128,153 | 7/1992 | Axelrod | 426/2 |
| 5,140,943 | 8/1992 | Nearhoff | 119/51.04 |
| 5,240,336 | 8/1993 | Miller | 24/67.5 |
| 5,269,338 | 12/1993 | Figas | 137/140 |

*Primary Examiner*—Edgar S. Burr
*Assistant Examiner*—Dave A. Ghatt
*Attorney, Agent, or Firm*—Townsend and Townsend and Crew LLP

[57] ABSTRACT

An aquatic animal feeding assembly for use with aquariums, tanks, pools or the like. The feeding assembly (4) comprises an outer magnet (34) placed adjacent an outer surface of the aquarium wall (14) and an inner magnet (32) placed opposite the outer magnet on the inner surface of the aquarium wall such that the magnets attract to each other against the aquarium wall. A food holder (42, 60, 70) is attached to the inner magnet for releasably holding food within the aquarium. The magnets generate an attractive magnetic force sufficient to hold each other in place opposite the aquarium wall. In addition, the outer magnet may be moved along the aquarium wall to thereby move the inner magnet and the food holder to a desirable location within the aquarium.

13 Claims, 3 Drawing Sheets

MAGNETIC DEVICE AND METHOD FOR FEEDING AQUATIC ANIMALS

BACKGROUND OF THE INVENTION

This invention relates to aquariums generally and more specifically to a magnetic feeding assembly for feeding aquatic animals, such as fish, within aquariums, tanks or the like.

Many people, for pleasure or otherwise, maintain fish ponds, tanks or aquariums for the purpose of nurturing and cultivating the growth of fish and comparable aquatic dwellers. For example, marine aquariums or large tanks are commonly used to house plants, fish, clams, and the like for exhibition or other purposes. It is customary and often necessary to supply food to the aquarium in order to feed these aquatic animals.

One common method presently used for feeding aquatic animals is to drop a piece of frozen food, such as shrimp or clams, into the water within the aquarium. The frozen food typically floats to the water surface and, while the food is thawing, the current swirls the food about the surface of the aquarium, dropping pieces of food into rocks, plants, and aquarium decorations. In addition, portions of the food may by pulled into the filter system, thereby exiting the aquarium. The food is not easily obtained by the fish and may decompose or rot, producing a filthy, malodorous mass that is difficult to clean from the floor of the aquarium.

Another common method of feeding fish is to hold green vegetation, such as lettuce, with a plastic clip attached to a suction cup. The suction cup is mounted to an inside wall surface of the aquarium so that the fish may swim along and pick at the piece of lettuce held by the plastic clip. One drawback with this method is that the user must put their hand or arm into the aquarium water in order to mount the suction cup against the aquarium walls. In addition, the water and/or the fish tugging at the lettuce often degrades the bond between the suction cup and the aquarium wall, causing the plastic clip and the food to fall to the bottom of the tank.

Tropical fish are often fed by placing small freshwater worms, such as live Tublifex worms, into worm feeders having an open end so that the tropical fish can access the worms. Existing worm feeders typically comprise a fluted cone designed to float at the aquarium's surface or to be mounted to the surface of the glass wall with a suction cup. This conical design, however, makes it difficult for larger, tall body fish, such as Angel fish, to feed from. In addition, with the surface worm feeder, the fish must often feed with the bright aquarium lights in their eyes, which tends to decrease the desire of the fish to feed.

What is needed, therefore, is a device and method for feeding fish within aquariums, tanks, pools or the like. This device should be relatively easy to insert and remove from the aquarium, preferably without getting the user's hands and arms wet. Furthermore, the device and method should be capable of being moved to locations that best suit the fish feeding habits so that the food is readily accessible to the fish, thereby minimizing loss and waste of the food. Additionally, the fish feeding device should be securely mounted to the aquarium walls so that the food does not fall to the bottom of the tank.

SUMMARY OF THE INVENTION

The present invention is directed to an aquatic animal feeding assembly for use with aquariums, tanks, pools or the like. The feeding assembly comprises an outer magnet placed adjacent an outer surface of the aquarium wall and an inner magnet placed opposite the outer magnet on the inner surface of the aquarium wall such that the magnets attract to each other against the aquarium wall. A food holder is attached to the inner magnet within the aquarium for releasably holding food within the aquarium. The magnets generate an attractive magnetic force sufficient to hold each other in place opposite the aquarium wall. In addition, the outer magnet may be moved along the aquarium wall to thereby move the inner magnet and food holder to a desirable location within the aquarium.

The present invention provides a relatively easy, yet effective technique for feeding fish within aquariums. Since the food holder can be positioned and mounted within the aquarium by moving the outer magnet along the surface of the aquarium wall, the user does not need to get his hands or arms wet. The food holder may also be easily moved to different locations that suit the feeding habits of particular fish so that the food is readily accessible to the fish, thereby minimizing loss and waste of the food. In addition, the magnetic force generated by the magnets provides an effective bond that will generally resist the tugging force of fish and typically will not degrade in the aquarium water.

In a first embodiment, the first and second magnets are each housed within a casing having a cover sheet with a relatively smooth material for minimizing friction between the outer aquarium wall and the casing. A food enclosure having a plurality of holes is attached to the inner casing. Frozen food is placed within the closure and the outer casing is moved to a suitable location that best suits the fish feeding habits of the particular fish within the tank. The fish will pick at the frozen food within the enclosure until the food begins to thaw and gradually releases into the aquarium. Since the enclosure can be moved to the suitable fish feeding location, the fish will eat the majority of the food before it sinks to the bottom of the tank, thereby minimizing waste of the food.

In a second embodiment, a clip is attached to the casing and includes a clamping element for holding food, such as a piece of lettuce, and a pair of grips for opening and closing the clamping element. The lettuce may be moved to any location in the aquarium simply by moving the outer casing alongside the aquarium wall. In addition, the magnetic force provides a strong mount to overcome the forces applied by fish tugging at the lettuce within the clamping element of the clip.

In a third embodiment, a worm feeder is attached to the inner casing. The worm feeder comprises a generally cylindrical enclosure with a plurality of relatively small holes. The worm feeder is moved to a suitable location along a side wall of the aquarium, where fish may pull worms, e.g., live Tublifex worms, through the holes in the enclosure. The holes are small enough to prevent or inhibit small fish from entering the enclosure and becoming trapped. In addition, the larger tall body fish may feed from the worm feeder because it extends laterally from the side wall of the aquarium.

The above is a brief description of some deficiencies in the prior art and advantages of the present invention. Other features, advantages and embodiments of the invention, will be apparent to those skilled in the art from the following description, accompanying drawings and appended claims.

DESCRIPTION OF THE PREFERRED EMBODIMENTS

Figure 1:
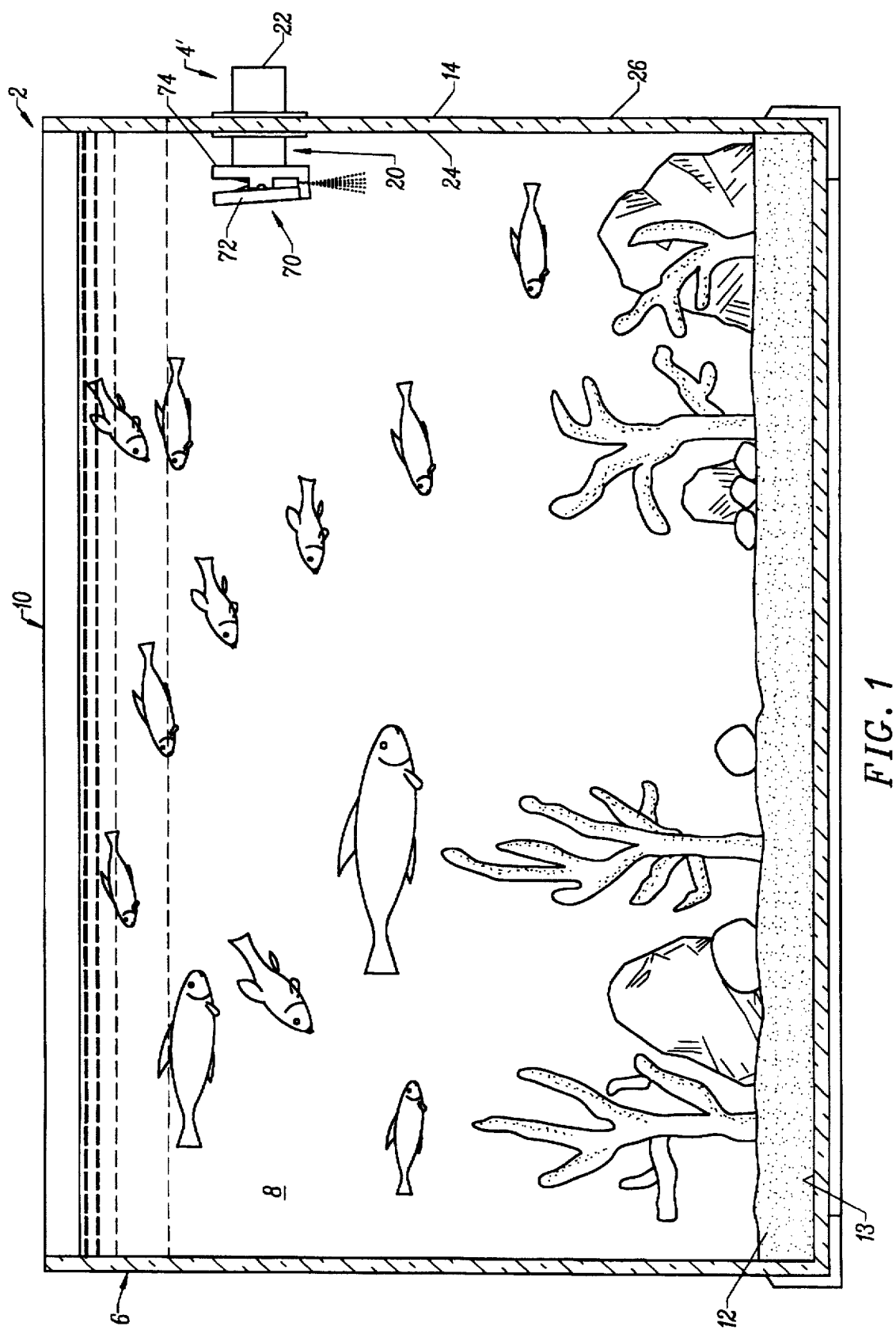
FIG. 1 is a side cross-sectional view of a marine aquarium incorporating a fish feeding assembly according to the principles of the present invention.

Referring to the drawings in detail, wherein like numerals indicate like elements, a marine aquarium 2 incorporating a feeding assembly 4 is illustrated according to the principles of the present invention. As shown in FIG. 1, marine aquarium 2 generally includes an enclosure 6 housing a supply of fresh or salt water 8 and defining an open upper end 10 to facilitate access to the interior of enclosure 6. Of course, aquarium 2 may include another opening for access therein so that upper end 10 can be closed, if desired. Aquarium 2 usually contains about 20 to 500 gallons of water and will preferably include a bed of sand 12 covering a lower surface 13 of enclosure 6 and a variety of rocks, coral or the like resting on the bed of sand 12. In addition, a multitude of animals, such as fish, clams, plants and other aquatic life will typically inhabit the aquarium. It will, of course, be understood that the present invention is not limited to the specific aquarium shown in FIG. 1. That is, the fish feeding assembly 4 of the present invention can be utilized in a variety of different types of aquariums having a variety of aquatic life.

Figure 3:
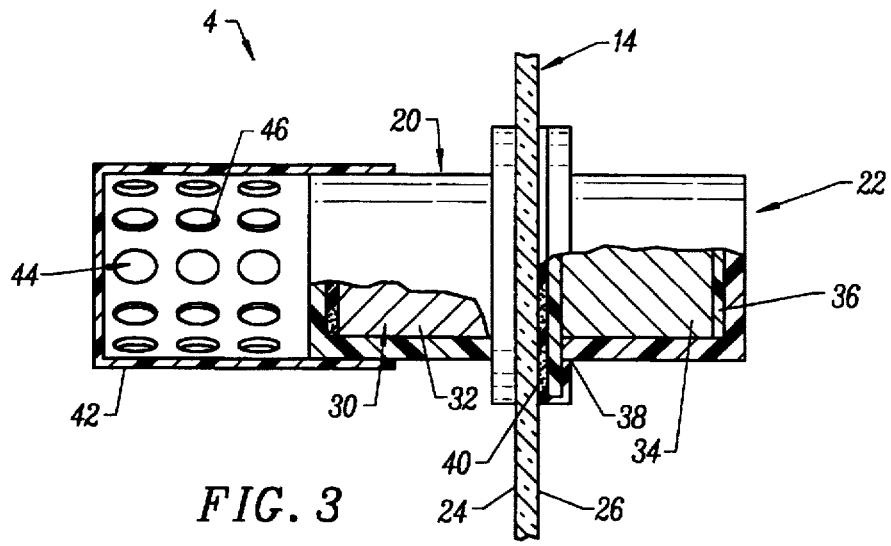
FIG. 3 is an enlarged side cross-sectional view of an alternative embodiment of the present invention, incorporating a frozen fish food enclosure.

As shown in FIG. 1, fish feeding assembly 4 will usually be mounted to one of the side walls 14 of enclosure 6, which typically comprise a transparent material capable of withstanding relatively high water pressures, such as glass. Referring to FIG. 3, fish feeding assembly 4 comprises first and second casings 20, 22 mounted on inner and outer surfaces 24, 26 respectively, of aquarium side wall 14. Casings 20, 22 preferably comprise a relatively inexpensive and easy material to manufacture, such as plastic. Casings 20, 22 each define an inner cavity 30 for receiving magnets 32, 34 respectively. First and second magnets 32, 34 rest within cavities 30, preferably against a strip of foam 36 or other soft material to protect the outer ends of casings 20, 22. Casings 20, 22 each include a cover 38 for holding magnets 32, 34 within cavities 30 and a strip 40 of relatively smooth material, such as felt or the like, for minimizing friction between casings 20, 22 and aquarium wall 14 as the casings are moved along the wall (discussed in more detail below).

First and second magnets 32, 34 are conventional magnets having opposite magnetic poles on either side thereof. Magnets 32 and 34 are oriented within casings 20, 22 such that opposite poles of each magnet 32, 34 are disposed adjacent the casing cover 38. The covers 38 of magnets 32, 34 are then juxtaposed each other adjacent aquarium wall 14. The opposite poles of magnets 32, 34 attract the magnets towards each other so that casings 20, 22 are securely mounted to aquarium wall 14. Magnets 32, 34 will provide a magnetic force that creates a bond therebetween sufficient to resist substantial tugging forces from fish and the eroding action of the aquarium water.

In a first embodiment (shown in FIG. 3), fish feeding assembly 4 further includes a food holder 42 releasably attached to inner casing 20. Preferably, the diameter of food holder 42 will be slightly larger than the diameter of inner casing 20 so that food holder 42 is held onto inner casing 22 by friction. Food holder 42 is preferably a cylindrical hollow tube having an inner cavity 44 for housing food, e.g., a frozen food, such as shrimp. Food holder 42 includes a plurality of holes 46 spaced apart around the circumference of food holder 42. Holes 46 are large enough to allow fish to tug at portions of the frozen food therein and to allow the frozen food to pass therethrough as it thaws. Holes 46 will also be small enough to prevent smaller fish from entering food holder 42. Usually, holes will have a square area in the range of $5/32$ to $¼$ inches$^2$ and preferably $3/16$ to $7/32$ inches$^2$.

In operation, the user places frozen food into food holder 42 and slides open end 42 of holder 42 over a portion of inner casing 20. Inner and outer casings 20, 22 are then aligned with each other opposite aquarium wall 14 near upper end 10 so that the user can mount feeding assembly 4 to wall 14 without getting his or her hands wet in the aquarium water 8. The user then moves outer casing 22 to a location that best suits the fish feeding habits of the aquarium. As outer casing 22 is moved along aquarium wall 14, magnet 32 will attract magnet 34 so that inner casing 20 and food holder 42 move along therewith. Once fish holder 42 is suitably positioned within aquarium 2, the fish will usually pick at the frozen food therein. As the frozen food thaws, it will flow through holes 46 and the fish, which will usually be assembled around food holder 42, will eat a substantial portion of the dropping pieces of food before the food falls to the bottom of the aquarium. Since the holder 42 is in the desired location for fish feeding, a substantial portion of the food will be eaten before current swirls urge pieces of food into rocks, plants and/or into the filter system (not shown) of the aquarium.

Figures 2, 4:
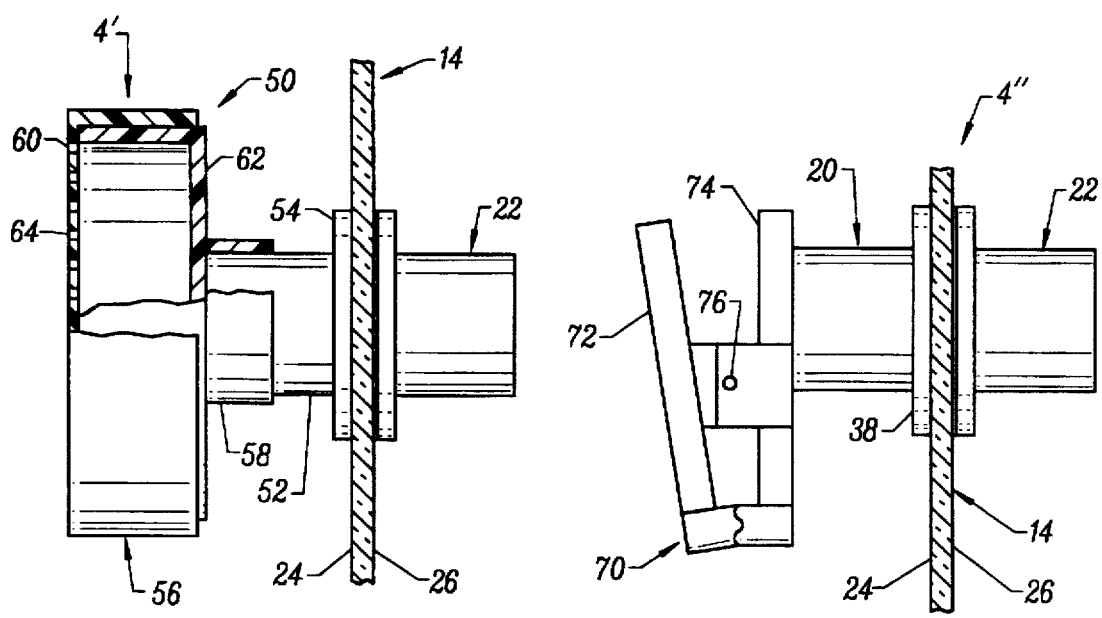
FIG. 2 is an enlarged side cross-sectional view of the fish feeding assembly of FIG. 1, illustrating a clip for holding fish food.
FIG. 4 is a side cross-sectional view of another embodiment of the fish feeding assembly incorporating a worm feeder attached to the inner casing.

FIG. 4 illustrates another embodiment of the fish feeding assembly of the present invention. In this embodiment, fish feeding assembly 4' comprises an inner casing 50 having a central hub 52 defining an inner cavity (not shown) for receiving magnet 32. Casing 50 includes a cover 54 and a piece of felt (not shown) mounted to hub 52 to contain magnet 34 and to facilitate movement of casing 50 along inner surface 24 of aquarium wall 14, as in the previous embodiment. Casing 50 further includes a worm housing 56 having a fitting 58 sized to slide over central hub 52. Worm housing 56 comprises a first hub portion 60 slidably mounted over a second hub portion 62 for placement of worms within housing 56. Front hub portion 60 defines a plurality of small holes 64 on a front wall 66. Holes 64 are sized to allow fish to pull worms therethrough, but to prevent the passage of small fish into housing 56. Usually, holes will have a square area of $3/64$ to $5/64$ inches$^2$ and preferably $1/16$ inches$^2$.

In operation, a plurality of small fresh or salt water worms, such a Tublifex worms, are placed within housing 56 an first and second hub portions 60, 62 are coupled together to enclose the worms therein. Fitting 58 is then slid over central hub 52 of casing 50 to frictionally secure housing 56 to hub 52. As in the previous embodiment, inner and outer casings 50, 22 are aligned with each other opposite aquarium wall 14 and moved to a suitable location within aquarium 2. fish will tug at the worms through holes 64. Since the worm feeder extends laterally from side wall 14 of aquarium 2, relatively large, body fish are generally capable of accessing the worms within housing 56.

Figure 5:
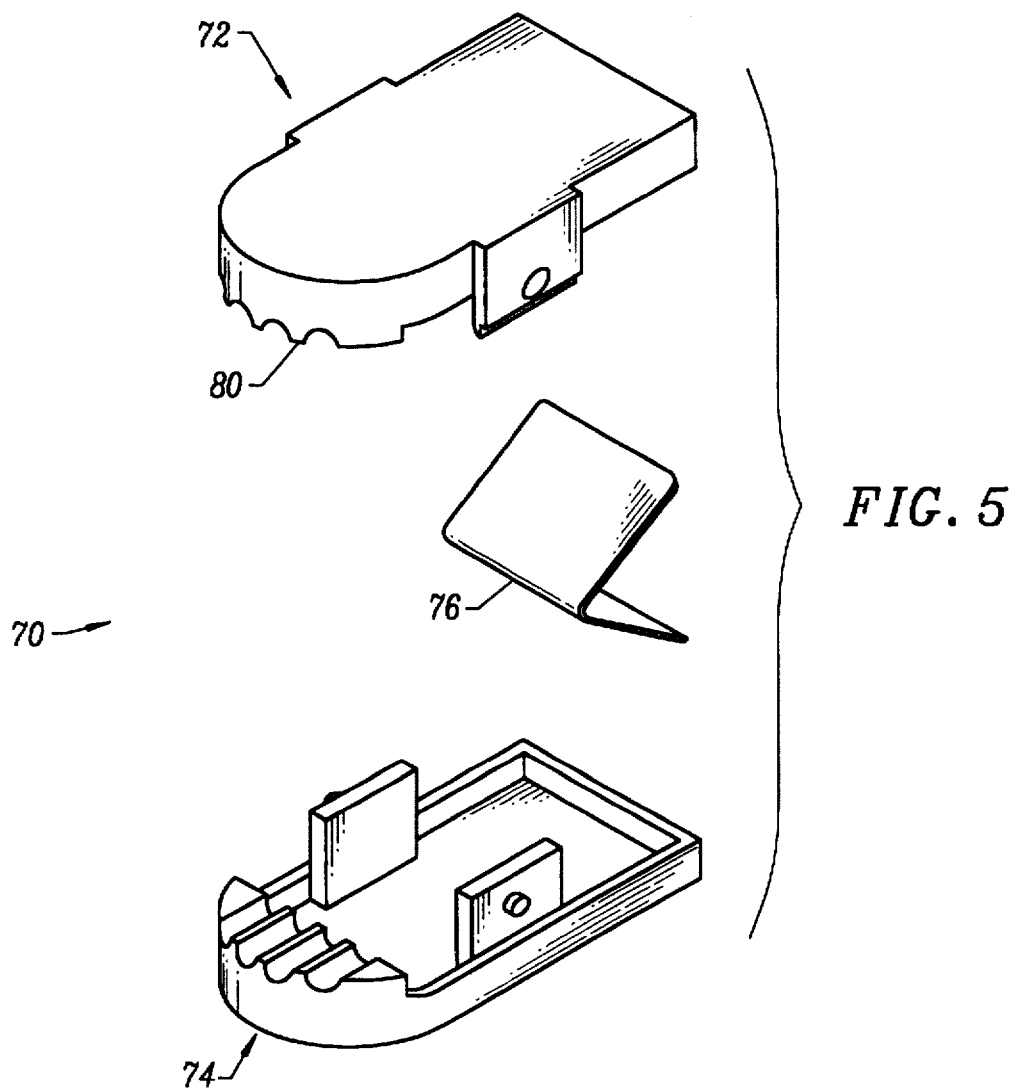
FIG. 5 is an exploded view of the clip of FIG. 2.

Referring to FIGS. 1, 2 and 5, yet another alternative embodiment of fish feeding assembly 4 is illustrated. In this embodiment, fish feeding assembly 4" includes a clip 70 integral with the outer surface of inner casing 20. Clip 70 and inner casing 20 are preferably formed as a single piece in an injection molding process. Clip 70 comprises a pair of jaws 72, 74 pivotally coupled together about a pivot point 76 for movement between open and closed positions. As shown in FIG. 5, a spring 76 is mounted at one end of clip 70 to bias jaws into the closed position. Spring 76 will apply a clamping force sufficient to hold a piece of food, such as lettuce, between jaws 52, 54. The clamping force will be selected to allow fish to tug at the lettuce and thereby tear portions of the lettuce from jaws 72, 74. Fish feeding assembly 4' is mounted to and moved along side walls 14 of aquarium in a similar manner as the above embodiment.

FIG. 5 illustrates a preferred embodiment of clip 70. It should be clearly understood, however, that the present invention is not limited to the configuration shown. That is, a variety of conventional fish feeding clips can be utilized with the magnet mounting assembly of the present invention. As shown in FIG. 5, jaws 72, 74 of clip 70 preferably comprise an arcuate front portion 79 having a plurality of ridges 80 to facilitate gripping food between the jaws in the closed position. In addition, jaw 72 includes a pair of pivot holes 82 on either side of jaw 72 for receiving pivot pins 84 one either side of jaw 74 and allowing movement between the open and closed positions.

Although the foregoing invention has been described in detail for purposes of clarity of understanding, it will be obvious that certain modifications may be practiced within the scope of the appending claims. For example, the magnetic mounting assembly of the present invention may be used with a variety of conventional fish feeders other than those shown above and illustrated in the figures.

What is claimed is:

1. An aquatic animal feeding assembly for use with an aquarium comprising:

a first magnet having a first magnetic pole adapted for movable placement adjacent an outer surface of an outer wall of an aquarium;

a second magnet having a second magnetic pole opposing the first magnetic pole and being adapted for movable placement within an aquarium adjacent an inner surface of said outer wall of an aquarium opposite the first magnetic pole;

first and second casings housing the first and second magnets, respectively;

a food holder attached to the second casing for releasably holding food within an aquarium;

wherein the first and second magnets generate a magnetic force sufficient to hold each other in place against the outer aquarium wall;

wherein the first and second casings are movable with respect to the outer wall of the aquarium, the magnets being positioned within the casings such that movement of the first casing along an outer surface of the outer wall causes a corresponding movement of the second casing along an inner surface of the outer wall; and further comprising a cover sheet attached to each of the casings adjacent the attraction surfaces of the magnets, the cover sheet comprising a relatively smooth material for minimizing friction between the outer wall of the aquarium and the cover sheet when the casings are moved relative to the outer wall.

2. An aquatic animal feeding assembly comprising:

an aquarium having an outer wall defining inner and outer surfaces;

a first magnet having a first magnetic pole and being movably mounted adjacent to the outer surface of the outer aquarium wall;

a second magnet having a second magnetic pole opposing the first magnetic pole and being movably mounted within the aquarium adjacent to the inner surface of the outer aquarium wall opposite the first magnet;

first and second casings housing the first and second magnets, respectively;

a first and second cover sheet attached to the first and second casings, respectively, said cover sheets comprising a relatively smooth material for minimizing friction between the outer wall of the aquarium and the cover sheet when the casings are moved relative to the outer wall; and a food holder attached to the second magnet for releasably holding food within the aquarium;

wherein the first and second magnets generate a magnetic force sufficient to hold each other in place along the outer aquarium wall.

3. The feeding assembly of claim 2 wherein the food holder comprises a clip having a clamping element for holding food and a pair of grips for opening and closing the clamping element.

4. The feeding assembly of claim 2 wherein the food holder comprises an enclosure for housing food and having a plurality of holes for allowing aquatic animals to access the food contained therein.

5. The feeding assembly of claim 4 wherein the holes are sized for allowing fish to access the food contained within the enclosure.

6. The feeding assembly of claim 5 wherein the holes have a square area of $5/32$ to $1/4$ in$^2$.

7. The feeding assembly of claim 4 wherein the food holder comprises a worm feeder having a plurality of holes sized for allowing fish to access worms contained within the enclosure.

8. The feeding assembly of claim 7 wherein the holes have a square area of $3/64$ to $5/64$ in$^2$.

9. The feeding assembly of claim 2 wherein the outer wall of the aquarium comprises glass.

10. A method for feeding aquatic animals within an aquarium comprising:

providing a food holder attached to a first magnet;

positioning the food holder adjacent an inner surface of an outer wall of the aquarium, said first magnet being positioned within a first casing having a first cover sheet comprising a relatively smooth material for minimizing friction between said inner surface and said first magnet;

holding food using the food holder coupled to the first magnet;

securing the first magnet and the food holder therewith in position against the inner surface of the aquarium wall with a second magnet disposed against the outer surface of the aquarium wall opposite the first magnet, said second magnet being positioned within a second casing having a second cover sheet comprising a relatively smooth material for minimizing friction between said outer surface and said second magnet; and translating the second magnet along the outer surface of the aquarium wall to move the first magnet and the food holder therewith along the inner surface of the aquarium wall.

11. The method of claim 10 wherein the holding step comprises gripping food within a clamping element of a clip attached to the first magnet.

12. The method of claim 10 wherein the holding step comprises:

housing worms within an enclosure attached to the first magnet and having a plurality of holes; and selecting a size of the holes such that fish may access the worms through the holes.

13. A method for feeding aquatic animals within an aquarium comprising:

positioning a first magnet adjacent an inner surface of an outer wall of the aquarium;

housing frozen food within an enclosure attached to the first magnet;

securing the first magnet and the enclosure in position against the aquarium wall with a second magnet disposed against the outer surface of the aquarium wall opposite the first magnet;

translating the second magnet along the outer surface of the aquarium wall to move the first magnet and the enclosure along the inner surface of the aquarium wall; and allowing the food to thaw and pass through holes in the enclosure into water within the aquarium.

\* \* \* \* \*